United States Patent
Venugopal et al.

(10) Patent No.: US 9,899,042 B1
(45) Date of Patent: Feb. 20, 2018

(54) DATA WRITER WITH LAMINATED FRONT SHIELD

(71) Applicant: Seagate Technology LLC, Cupertino, CA (US)

(72) Inventors: Vijayaharan A. Venugopal, Londonderry (GB); Muhammad Asif Bashir, Londonderry (GB); Peter McGeehin, Letterkenny (IE); Marcus B. Mooney, Quigley's Point (IE); Mark Gubbins, Letterkenny (IE)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/018,311

(22) Filed: Feb. 8, 2016

(51) Int. Cl.
  *G11B 5/11* (2006.01)
  *G11B 5/235* (2006.01)
  *G11B 5/31* (2006.01)
  *G11B 5/127* (2006.01)

(52) U.S. Cl.
  CPC .......... *G11B 5/315* (2013.01); *G11B 5/11* (2013.01); *G11B 5/1278* (2013.01); *G11B 5/235* (2013.01); *G11B 5/3146* (2013.01)

(58) Field of Classification Search
  None
  See application file for complete search history.

(56) References Cited

U.S. PATENT DOCUMENTS

| | | | |
|---|---|---|---|
| 6,275,360 B1* | 8/2001 | Nakamoto et al. | G11B 5/3109 360/317 |
| 6,396,660 B1* | 5/2002 | Jensen et al. | G11B 5/3133 360/123.37 |
| 7,212,379 B2 | 5/2007 | Hsu et al. | |
| 7,894,159 B2 | 2/2011 | Lengsfield, III et al. | |
| 8,149,537 B2 | 4/2012 | Nazarov | |
| 8,194,969 B2 | 6/2012 | Shimura | |
| 8,233,233 B1 | 7/2012 | Shen et al. | |
| 8,254,060 B1 | 8/2012 | Shi et al. | |
| 8,339,741 B2 | 12/2012 | Zhang et al. | |
| 8,451,562 B2 | 5/2013 | Pentek et al. | |
| 9,042,058 B1 | 5/2015 | Li et al. | |
| 9,147,407 B2 | 9/2015 | Tian et al. | |
| 2006/0198048 A1* | 9/2006 | Flint et al. | G11B 5/313 360/125.3 |
| 2009/0168260 A1* | 7/2009 | Allen et al. | G11B 5/3153 360/319 |

* cited by examiner

Primary Examiner — Craig A. Renner
(74) Attorney, Agent, or Firm — Hall Estill Attorneys at Law

(57) ABSTRACT

A data storage device data writer may arrange a write pole to be positioned uptrack from a front shield on an air bearing surface. The front shield can consist of a lamination of a first magnetic alloy material and a second magnetic alloy material. The second magnetic alloy material may be NiFe that has 80% iron by weight.

19 Claims, 3 Drawing Sheets

DATA WRITER WITH LAMINATED FRONT SHIELD

SUMMARY

A data writer, in accordance with some embodiments, positions a write pole uptrack from a front shield on an air bearing surface. The front shield consists of a lamination of a first magnetic alloy material and a second magnetic alloy material with the second magnetic alloy material constructed of NiFe with 80% iron by weight.

DETAILED DESCRIPTION

In data storage devices, such as rotating media hard disk drives, increasing data capacity corresponds with decreasing the spacing between data bits. Such increased data density is accessed by physically smaller components, such as a data writer. A physically smaller data writer shield can become easily saturated with magnetic flux from an adjacent write pole and cause unwanted erasure of data on a data storage medium. Hence, various embodiments of the present disclosure configure a data writer front shield to provide optimized shielding characteristics despite close physical proximity to the write pole.

Constructing data writer shields, such as side shields that are laterally adjacent a write pole or a front shield that is positioned downtrack from a write pole, of a soft magnetic material that have high magnetic moments, reduced magnetic coercivity ($H_c$), and less anisotropy field ($H_k$) compared to hard magnetic materials can improve data writer response and produce optimized magnetic field and gradient. With large percentage of data bit writing magnetic flux emanating from a downtrack, trailing edge of the write pole that is positioned proximal the front shield, the material construction of the front shield can be easily saturated via unwanted shunting that decreases the data writing performance and increases the risk of inadvertent data erasure.

Accordingly, a front shield of a data writer is configured, in some embodiments, with a lamination of first and second magnetic alloy layers where at least the second magnetic alloy material is NiFe with 80% iron by weight. The utilization of 80% iron in a NiFe layer contrasts to a NiFe layer composition with 55% iron by weight by providing a greater magnetic moment for the front shield along with lower $H_c$, less $H_k$, lower material stress after annealing operations, and less physical protrusion during operation. The ability to tune the front shield lamination for size, composition, and placement allows a data writer to be optimized for high data density data storage environments where data bits are in close physical proximity.

Figure 1:
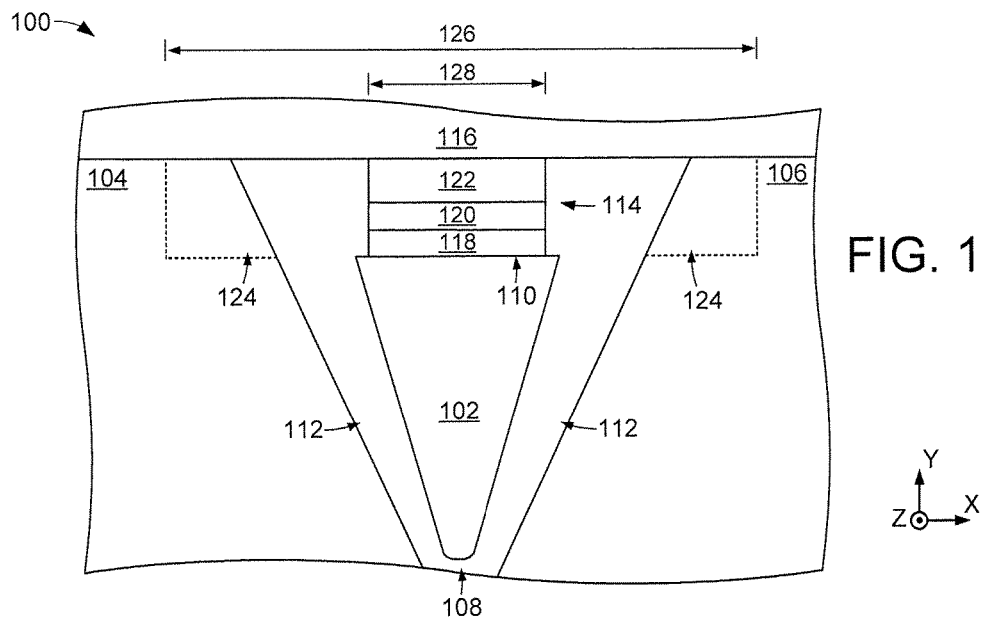
FIG. 1 is a line representation of a portion of example data writer arranged in accordance with various embodiments.

FIG. 1 is a line representation of a portion of an example data writer 100 as viewed from an air bearing. The data writer 100 has a write pole 102 that may be shielded from one or more return poles by at least one magnetic shield. As shown, the write pole 102 is disposed between first 104 and second 106 side shields that are each positioned laterally adjacent to the write pole 102 along a cross-track direction that is parallel to the X axis. Each side shield 104 and 106 continuously extends from a plane positioned uptrack from a leading edge 108 of the write pole 102 to a plane downtrack of the trailing edge 110 of the write pole 102, with the uptrack/downtrack direction being parallel to the Y axis and corresponding to data tracks of an adjacent data storage medium.

The write pole 102 has a substantially trapezoidal shape on the air bearing surface (ABS) that is separated from the side shields 104 and 106 by a non-magnetic gap material 112. While the size and separation distance of the gap material compared to the side shields 104 and 106 can be tuned to control the data writing performance of the write pole 102, decreasing the overall physical size of the data writer 100 can make such tuning inconsequential. Instead, a front shield 114 can be positioned proximal to the trailing edge 110 of the write pole 102 to provide a balance between a precise magnetic extent capable of accessing individual data bits and the risk of unwanted shunting from the write pole 102 to the side shields 104 and 106 as well as the trailing shield 116.

The front shield 114 is constructed with a non-magnetic cap layer 118 that contacts the trailing edge 110, a non-magnetic buffer layer 120, and a magnetic shield layer 122. The combination of different materials in the front shield 114, such as a transition metal material for the cap layer 118, Alumina for the buffer layer 120, and a CoFe alloy for the shield layer 122, allows for greater write field to flow through the write pole 102 without increasing the risk of shield saturation and subsequent data erasure.

In some embodiments, the side shields 104 and 106 are each shaped to provide a letterbox region 124 of non-magnetic material extending from the trailing edge 110 of the write pole 102 downtrack to the trailing shield 116. The letterbox region 124 has a width 126 that continuously extends along a cross-track direction to be greater than the width of any part of the write pole 102 or the width 128 of the front shield 114. The ability to arrange the width 126 of the letterbox region 124 relative to the write pole 102 and the width 128 of the front shield 114 allows increased control of errant magnetic flux on the ABS, which can increase write field amplitude and gradient.

Figure 2:
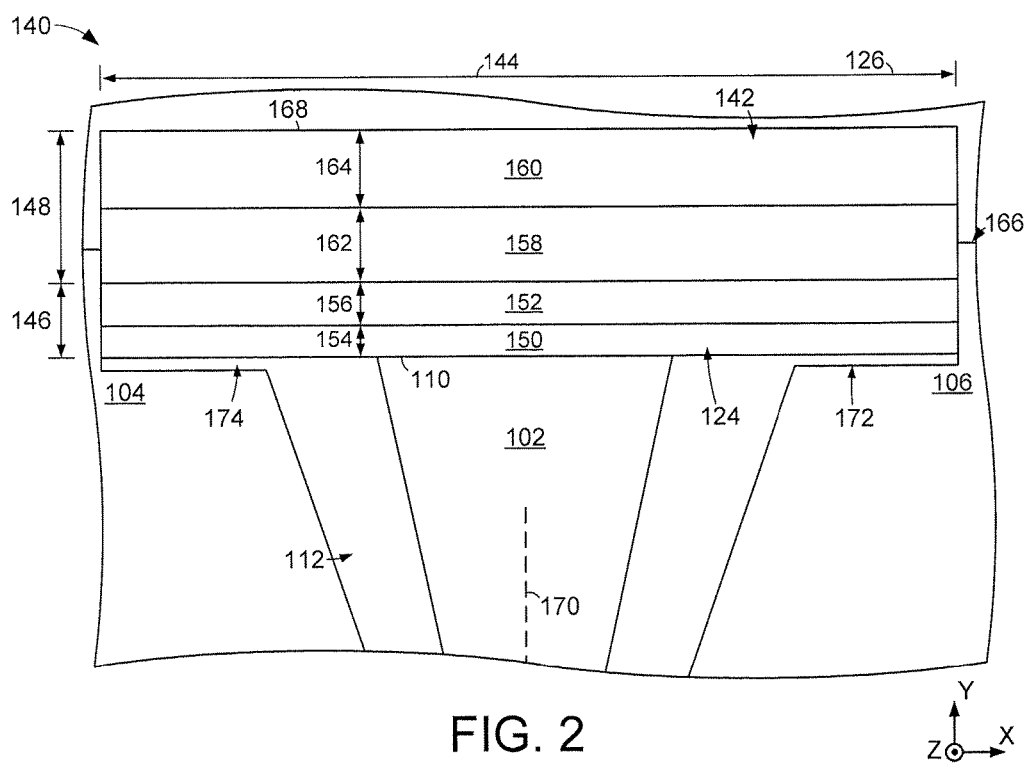
FIG. 2 displays an air bearing surface view of a portion of an example data writer configured in accordance with some embodiments.

FIG. 2 displays an ABS view line representation of a portion of an example data writer 140 configured in accordance with some embodiments. The data writer 140 occupies the letterbox region 124 with a front shield 142 that continuously extends to opposite sides of the write pole 102. That is, the front shield 142 has a width 144 that matches the width 126 of the letterbox region 124 so that the constituent layers of the front shield 142 extends from one side shield 104 and 106 to the other.

The front shield 142 is constructed of a cap lamination 146 that contacts the trailing edge 110 of the write pole 102 and separates the shield lamination 148 from the trailing edge 110. The cap lamination 146 is not limited to a two layer configuration, but various embodiments have a transition metal material, such as Ru or Ta, contacting the trailing edge 110 in a first cap sub-layer 150 and a different non-magnetic material, such as Alumina, in a second cap sub-layer 152. The respective cap sub-layers 150 and 152 can have similar, or dissimilar, thicknesses 154 and 156 that can be tuned to provide a predetermined amount of separation between the shield lamination 148 and the write pole 102.

The shield lamination 148 may be configured with any number of magnetic materials. As a non-limiting example, a first shield sub-layer 158 can be constructed of CoFe or a CoFe alloy while a second shield sub-layer 160 comprises a NiFe material with 80% iron by weight. Although the shield sub-layers 158 and 160 can have similar thicknesses 162 and 164, such as 30 nm each, assorted embodiments provide different thicknesses 162 and 164 to produce an overall front shield 142 magnetic moment of more than 2.1 T, such as between 2.2-2.3 T.

The respective thicknesses 162 and 164 may also be tuned relative to the height of the side shields 104 and 106. That is, the shield lamination 148 may be tuned to extend to a plane that is downtrack, even with, or uptrack from a trailing plane 166 of the side shields 104 and 106. In other words, the trailing plane 166 of the side shields 104 and 106 may be positioned uptrack, as shown, may form a continuously smooth plane along the X axis, or may be positioned downtrack from a trailing surface 168 of the front shield 142. It is noted that the various thicknesses are each measured parallel to a longitudinal axis 170 of the write pole and the Y axis on the ABS.

As shown, the front shield 142 occupies a majority of the letterbox region 124 while contacting the trailing edge 110 of the write pole 102. In yet, the front shield 142 is separated from a leading surface 172 of the letterbox region 124 by a non-magnetic region 174. Such configuration is not limiting and other embodiments configure one or more layers of the front shield 142 to contact the leading letterbox surface 172, such as with varying layer thicknesses, so that the front shield 142 occupies the entirety of the letterbox region 124. Through tuning the size, materials, and thicknesses of the various layers of the front shield 142 allows the trailing edge 110 of the write pole to be shielded without degrading the response time, write field amplitude, or write field gradient in the write pole 102.

Figure 3:
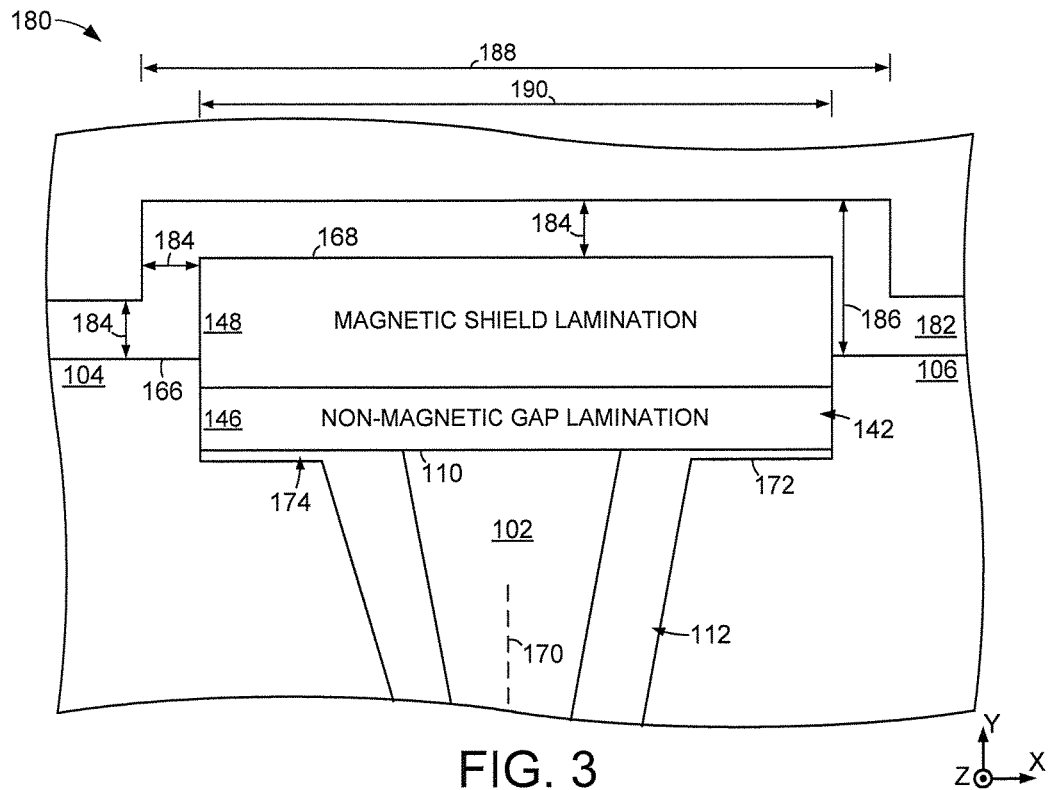
FIG. 3 illustrates an air bearing view line representation of a portion of an example data writer constructed in accordance with assorted embodiments.

It is contemplated that the front shield 142 is utilized alone in the shielding of the trailing edge 110 of the write pole 102. That is, the front shield 142 may be the only magnetic material aligned along the longitudinal axis 170 of the write pole. FIG. 3 illustrates an ABS view line representation of a portion of an example data writer 180 that employs multiple magnetic structures aligned along the longitudinal axis 170 of the write pole 102 to complement the magnetic shield lamination 148 of the front shield 142. As shown, a shielding layer 182 comprising a magnetic material continuously extends along a cross-track direction, parallel to the X axis, to contact each side shield 104 and 106 as well as the trailing surface 168 of the front shield 142.

Although not required or limiting, the shielding layer 182 is configured with a NiFe alloy with 80% iron by weight that has a varying thickness. The shielding layer 182 may be deposited in a variety of different manners, such as vapor deposition or sputtering, that provides a first thickness 184, such as 30-50 nm, in contact with the trailing surface 168 and each side shield 104 and 106. The first thickness 184 may also define a lateral width where the shielding layer 182 has an increased second thickness 186. That is, the front 142 and side 104 and 106 shields can contact the shielding layer 182 with at least the first thickness 184.

It is contemplated that the shielding layer 182 may have different thicknesses atop the trailing surface 168 compared to proximal the side shields 104 and 106. It is further contemplated that the shielding layer 182 may have curvilinear transitions between the first 184 and second 186 thicknesses extending between a width 188 of the shielding layer 182 and the width 190 of the front shield 142. In embodiments where the shielding layer 182 is constructed of the same material as the second shield sub-layer that defines the trailing surface 168, separate deposition means and/or annealing operations may be conducted to produce separate shielding components. For example, despite being similar materials, the shielding layer 182 can be formed after the front shield 142 has been annealed so that the shielding layer 182 has different shielding characteristics, such as anisotropy and/or magnetic moment, than the front shield 142.

Figure 4:
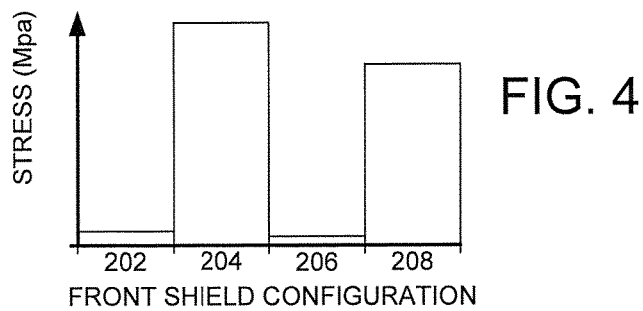
FIG. 4 graphs example structural data associated with various data writer configurations.
Figure 5:
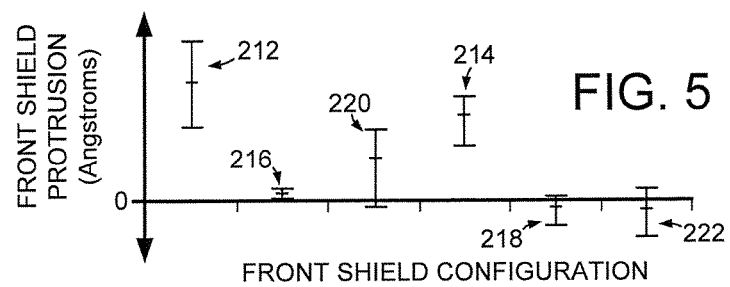
FIG. 5 plots example operational data for assorted data writer configurations.

By configuring the data writer 180 with at least one NiFe layer having 80% iron by weight can decrease the stress induced on various portions of the data writer 180. FIG. 4 graphs example structural data associated with various different front shield configurations. Bar 202 corresponds to a front shield employing an NiFe layer having 55% iron by weight before any annealing operations have been conducted. Bar 204 conveys the post-annealing stress placed on the front shield after the NiFe with 55% iron by weight has been heated to an elevated temperature, such as 225° C. for 2 hours under vacuum.

Bars 206 and 208 respectively illustrate pre-annealing and post-annealing stresses placed on a front shield when an NiFe magnetic material is employed that has 80% iron by weight. The respective bars 206 and 208 provide reduced stresses of bars 202 and 204 where the NiFe material construction with 55% iron by weight is present. The ability to decrease the stress placed on the front shield can increase the quality of magnetic characteristics of the front shield. For instance, a front shield experiencing less stress during formation can have an increased magnetic moment, reduced $H_c$, and less $H_k$ that optimize data writer performance.

The benefits of utilizing an NiFe front shield material with 80% iron by weight can also be realized by decreasing the shield protrusion during data writing operations. For clarity, shield protrusion can be characterized as the movement of any shield layer relative to the write pole 102 on the ABS as a result of operational heating. As illustrated by ranges 212 and 214, a CoFe magnetic alloy is employed in the front shield. The elevated protrusion of the CoFe front shield material serves as a control compared to ranges 216 and 218 that correspond with an NiFe front shield material with 55% iron by weight and ranges 220 and 222 that correspond with an NiFe front shield material with 80% iron by weight.

In ranges 212, 216, and 220, the front shield has shield layer with a uniform 50 Angstroms thickness while ranges 214, 218, and 222 each have a shield layer uniform thickness of 30 Angstroms. By plotting the protrusion of various front shield materials having different thicknesses, it can be appreciated how the protrusion of a front shield can be controlled by tuning the material and thickness of the front shield. It is noted that in front shields employing a lamination of multiple magnetic layers with, or without, different thicknesses, the material construction of those magnetic layers can be configured to provide a balance between material stress, protrusion, anisotropy, coercivity, moment, and shielding characteristics to optimize data writing performance.

Figure 6:
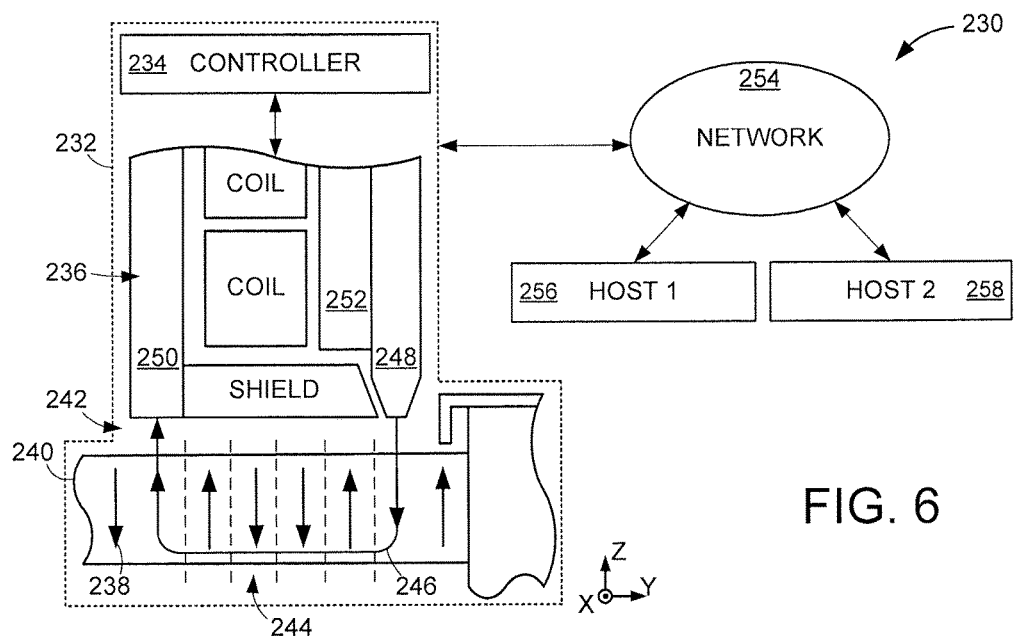
FIG. 6 is a line representation of portions of an example data storage system capable of employing a data writer in accordance with various embodiments.

A data writer is not limited to a particular environment or device. However, a data writer can be incorporated into the example data storage system 230 of FIG. 6 that is configured in accordance with various embodiments. The data storage system 230 may consist of one or more data storage devices 232 having one or more local controllers 234 directing operation of at least one transducing assembly 236 to access data bits 238 present in an adjacent data storage medium 240. The plurality of data bits 238 can be accessed across an air bearing 242 and arranged in data tracks 244.

Data can be written via a writing circuit 246 created passing from a main write pole 248, such as pole 102 of FIGS. 1-3, to one or more return poles 250. While not required as illustrated, the writing circuit 246 can be established by generating magnetic flux in coils that is translated to the write pole 248 via at least one yoke 252. It is noted that the transducing assembly 236 can include one or more transducing elements, such as a magnetic writer and magnetically responsive reader, which operate to program and read data from the storage medium 240, respectively.

The data storage device 232 may be operated locally and remotely through wired and/or wireless connection(s) to any number of hosts via at least one network 254. While not limited to any particular type or number of hosts, a first 256 and second 258 hosts can be remote servers, nodes, processors, or other computing means that may enable the data storage device 232 to be part of a cloud computing system or a redundant array of independent discs (RAID) via appropriate protocol. The unlimited variety of local and remote computing configurations allows the data storage system 230 to be adapted and optimized for a diverse array of applications.

Figure 7:
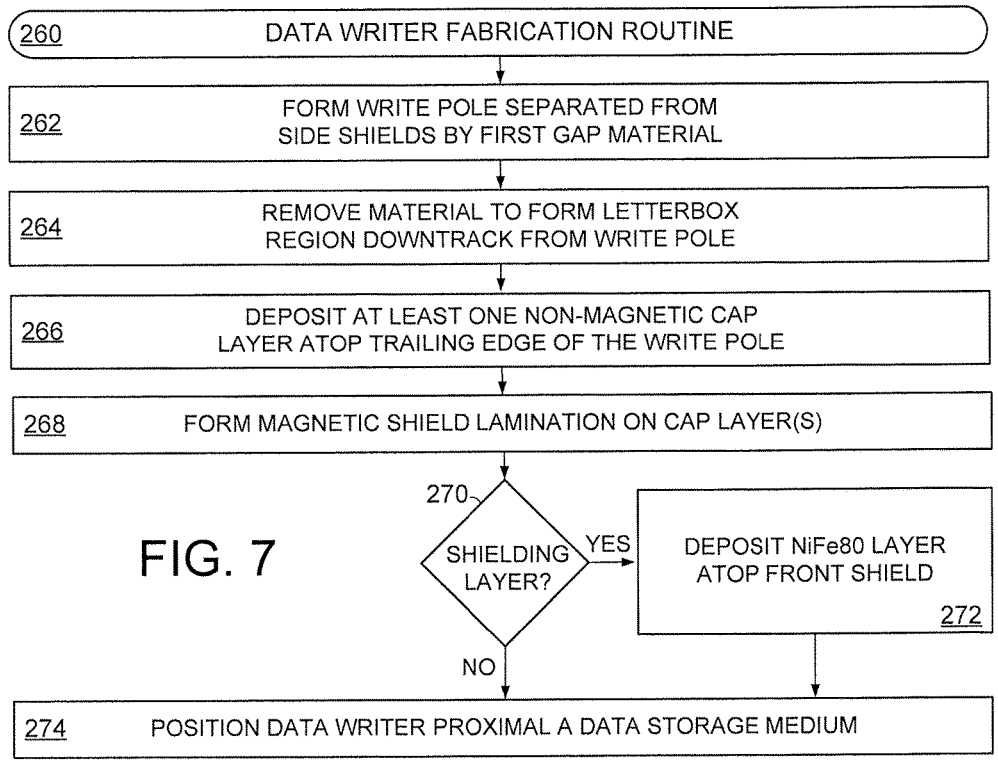
FIG. 7 provides an example data writer fabrication routine that may be carried out in accordance with some embodiments.

FIG. 7 is a flowchart of an example data writer fabrication routine 260 that can be carried out to construct a data writer in accordance with the embodiments discussed in FIGS. 1-6. A write pole is initially formed in step 262 is disposed between first and second side shield while being separated from the side shields by one or more gap materials. Step 264 then removes portions of each side shield to create a letterbox region proximal a trailing edge of the write pole.

The letterbox region is partially, or completely, filled in step 266 by the deposition of at least one non-magnetic cap layer that contacts the trailing edge of the write pole. A shield lamination is subsequently formed in step 268 atop the cap layer(s) and comprises at least a NiFe sub-layer with 80% iron by weight. Next, decision 270 determines if a shielding layer, such as layer 182 of FIG. 3, is to be incorporated into the data writer. A shielding layer of the NiFe material having 80% iron by weight (NiFe80) is deposited in 272 atop the front shield to be in concurrent contact with each side shield and the front shield while having a varying thickness.

After the NiFe80 material is formed in step 272, or in the event no shielding layer is formed at all, step 274 incorporates a completed data writer in a transducing head that is positioned proximal a data storage medium. It is noted, however, that the various aspects of routine 260 are not required or limiting. As such, any step and decision can be changed or removed just as additional steps and/or decisions can be inserted at will. For example, an additional step may process the shielding layer formed in step 272 to provide a uniform, or varying, thickness proximal the front shield.

While the embodiments herein have been directed to a data writer for a rotating data storage device, it will be appreciated that the various embodiments can readily be utilized in any number of other applications, such as other magnetic shielding environments. It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a write pole positioned uptrack from a front shield on an air bearing surface (ABS), the front shield comprising a lamination of first and second magnetic alloys, the second magnetic alloy comprising NiFe with 80% iron by weight, the front shield disposed between and in contact with first and second side shields each side shield continuously extending from the front shield to a position uptrack from a leading edge of the write pole.

2. The apparatus of claim 1, wherein the first magnetic alloy comprises CoFe.

3. The apparatus of claim 1, wherein the first magnetic alloy is disposed between and contacts both a non-magnetic material and the second magnetic alloy.

4. The apparatus of claim 1, wherein the lamination has a magnetic moment of 2.2-2.3 T.

5. The apparatus of claim 1, wherein the first magnetic alloy has a thickness of 30 nm, the thickness measured parallel to a longitudinal axis of the write pole on the ABS.

6. The apparatus of claim 1, wherein the second magnetic alloy has a thickness of 30 nm, the thickness measured parallel to a longitudinal axis of the write pole on the ABS.

7. The apparatus of claim 1, wherein the front shield contacts a trailing edge of the write pole.

8. The apparatus of claim 1, wherein the front shield is disposed between and contacts opposite sides of a letterbox region defined by the first and second side shields.

9. The apparatus of claim 1, wherein the first and second magnetic alloys respectively have uniform thicknesses that continuously extend from the first side shield to the second side shield.

10. An apparatus comprising a write pole positioned uptrack from a front shield on an air bearing surface (ABS), the front shield comprising a lamination of a first magnetic alloy and a second magnetic alloy, the second magnetic alloy comprising NiFe with 80% iron by weight, a third magnetic ally continuously extends from a first side of the front shield to an opposite second side of the front shield to concurrently contact first and second side shields and the front shield on the ABS, the front shield separated from the write pole by a cap lamination and separated from a leading surface of a letterbox region by a non-magnetic region.

11. The apparatus of claim 10, wherein a transition metal material of the cap lamination has a thickness of 1 nm, the thickness measured parallel to a longitudinal axis of the write pole on the ABS.

12. The apparatus of claim 10, wherein the third magnetic alloy comprises a NiFe material with 80% iron by weight.

13. The apparatus of claim 10, wherein the third magnetic alloy has a varying thickness proximal the front shield, the thickness measured parallel to a longitudinal axis of the write pole on the ABS.

14. The apparatus of claim 10, wherein the front shield is wider than the write pole on the ABS, the width of the front shield measured perpendicular to a longitudinal axis of the write pole.

15. An apparatus comprising a write pole separated from a front shield by a cap lamination on an air bearing surface (ABS), the front shield positioned downtrack of the write pole and comprises a shield lamination of a first magnetic alloy and a second magnetic alloy, the second magnetic alloy comprising NiFe with 80% iron by weight, the cap lamination contacting the write pole and a first surface of a letterbox region of a side shield, the cap lamination separated from a leading surface of the letterbox region by a non-magnetic region.

16. The apparatus of claim 15, wherein the cap lamination comprises first and second non-magnetic layers.

17. The apparatus of claim 16, wherein the first non-magnetic layer comprises a transition metal material and the second non-magnetic layer comprises Alumina.

18. The apparatus of claim 16, wherein the first and second non-magnetic layers each have uniform thicknesses on the ABS, the respective thicknesses being different and each measured parallel to a longitudinal axis of the write pole.

19. The apparatus of claim 16, wherein the first and second non-magnetic layers comprise different materials.

\* \* \* \* \*